United States Patent [19]
Foster

[11] Patent Number: 6,045,067
[45] Date of Patent: Apr. 4, 2000

[54] CHEMICAL EDGER

[76] Inventor: Wayne R. Foster, 1000 Old Lucile Rd., Blakely, Ga. 31723

[21] Appl. No.: 09/112,329

[22] Filed: Jul. 9, 1998

[51] Int. Cl.$^7$ ...................................................... B05B 3/00
[52] U.S. Cl. ............................................................. 239/754
[58] Field of Search ................................... 239/146, 172, 239/173, 722, 750–754

[56] References Cited

U.S. PATENT DOCUMENTS

| | | | |
|---|---|---|---|
| 733,653 | 7/1903 | Jones | 239/173 |
| 2,243,610 | 5/1941 | Spreng | 239/722 |
| 2,974,873 | 3/1961 | Joslyn et al. | 239/173 |
| 2,988,025 | 6/1961 | Johnston | 239/172 |
| 3,153,509 | 10/1964 | Curtis | 239/172 |
| 4,095,746 | 6/1978 | Anderberg et al. | 239/754 |
| 4,624,602 | 11/1986 | Kieffer et al. | 239/172 |
| 4,638,948 | 1/1987 | Marlek | 239/722 |

FOREIGN PATENT DOCUMENTS

| | | | |
|---|---|---|---|
| 665405 | 6/1963 | Canada | 239/722 |
| 1539281 | 1/1990 | Russian Federation | 239/722 |

*Primary Examiner*—Andres Kashnikow
*Assistant Examiner*—Dinh Q. Nguyen
*Attorney, Agent, or Firm*—Patent & Trademark ServicesThomas Zack; Joseph H. McGlynn

[57] ABSTRACT

A portable fluid dispenser apparatus for dispensing fluids on the ground. The apparatus has a lightweight rigid frame structure interconnecting a forward wheel with to a rear connected pressurized fluid container. A fluid conveying tube provides a fluid communication conduit between the fluid container and the top of the ground engaging front wheel. The tube's front end is opened and located above the wheel to dispense the pressurized fluid under and adjacent to the path to be immediately followed by the movable forward wheel. In this manner the deposited formed fluid path is substantially the same width as the width of the wheel. One use of the invention is to form a chemically deposited formed weed killer edge around the perimeter of a grassy or garden area similar to that formed by an electric or mechanical edger. Other fluids used in ground control such as fertilizers and pesticides, may also be used with this invention whenever a narrow wheel defined fluid deposition path is desired.

3 Claims, 1 Drawing Sheet

CHEMICAL EDGER

BACKGROUND OF THE INVENTION

Fluid dispensers have been for a considerable time to apply liquid weed killers, liquid insecticides, liquid fertilizers and other lawn and garden fluids either along the side edges of or directly on lawns or gardens. In many cases the fluid dispensers for such applications are hand-held fluid containers having hand operated pumps which pressurize the fluid in the container and then allow the fluid to be dispensed through a tube connected to the container with a distal outlet nozzle.

In other configurations the fluid dispensers have been mounted on or attached to a movable wheeled implement such as those commonly used in lawns or gardens. With such configurations the implement carries the fluid container and its associated pump along with the implement and dispenses the fluid to the ground as move is imparted to the implement. While these implement permit the fluid to be dispensed to the ground, their fluid deposited pattern may not dispense the fluid in a narrow path defined by the ground over which a wheel movement on the ground.

When the implements is a lawn edger having a single wheel that is moved along the side border edges of a lawn or garden, dispensing the fluid to killer unwanted growth, such as weeds, in a defined narrow path is critical to avoid the unwanted dispensing on desired lawn sections or garden plants. The present invention relates to a fluid dispenser which dispenses the fluid in a defined narrow path directly on or adjacent to the underlining path followed by a wheel having the dispenser's output nozzle mounted adjacent thereto all as further described herein.

DESCRIPTION OF THE PRIOR ART

Lawn and garden implements of many types have been used to carry fluid dispensers. For example, in U.S. Pat. No. 1,559,258 to Klusmeyer a portable fluid container and sprayer is used to destroy vermin on plants while mounted on a wheeled steam boiler that assists in the spraying operation.

In the Hartford reference (U.S. Pat. No. 4,369,596) a liquid applying apparatus is mounted on an operative lawn mower and used to dispense weed killers.

The Aiello et al. patent (U.S. Pat. No. 5,064,123) discloses a device for dispensing a pesticide having fluid containing tanks, a wand and controlling valves, an electrode to place an electrostatic charge on the pesticide all of which is mounted on a wheeled carrier.

In the Grote et al. invention (U.S. Pat. No. 5,195,308) a riding lawn mower carries the fluid which can be dispensed along the mower's cutting path or by a manually directed wand.

The present invention relates to a portable fluid dispenser used to dispense fluid directly on or adjacent to the path followed by a single movable wheel having the output nozzle adjacent thereto all as more fully set forth in this specification.

SUMMARY OF THE INVENTION

This invention relates to portable fluid dispenser combined with a single wheel to dispense fluid directly under and around a narrow path followed by the wheel. A pressurizable fluid container is in fluid communication with an outlet nozzle located adjacent the wheel and is connected thereto by a rigid lightweight support member.

It is the primary object of the present invention to provide for an improved fluid dispenser for dispensing a narrow deposition path on the ground around a movable wheel.

Another object is to provide for such a dispenser wherein there is a pressurized source of fluid in fluid communication with a outlet nozzle located adjacent the movable wheel.

These and other objects and advantages of the present invention will become apparent to readers from a consideration of the ensuing description and the accompanying drawings.

DESCRIPTION OF THE PREFERRED EMBODIMENT

Figure 1:
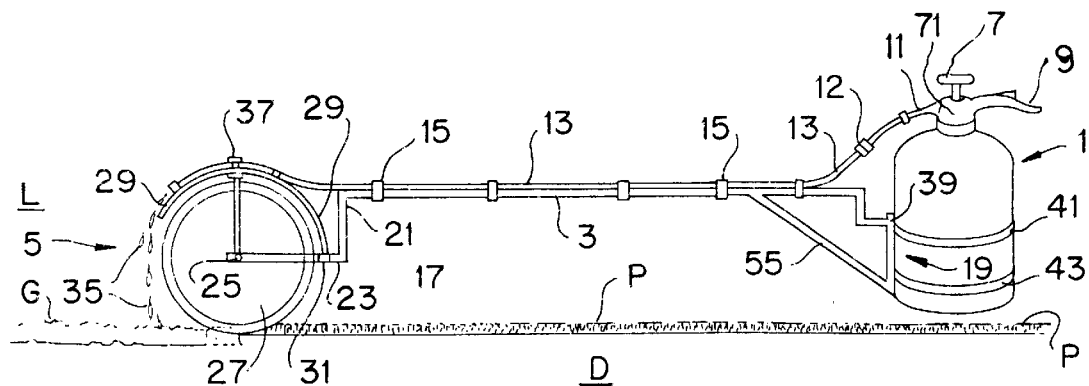
FIG. 1 is a perspective view of the invention's preferred embodiment.

FIG. 1 is a perspective view of the invention's preferred embodiment. The basic components include the fluid or chemical container 1, the rigid support structure 3, and the interconnected single wheel assembly 5 opposite the container. The container 1 may be a conventional pressurizable fluid dispenser have an upper hand operated pump handle 7, a rear hand operated trigger 9 and a front outlet nozzle assembly 11 connectable to a flexible plastic tubing 13. A hose twist connector 12 is interposed at the end tubular member from the nozzle assembly and used to connect the assembly to the tubing 13. By disconnecting the nozzle assembly from the tubing at connector member 12, the detachable top portion (71) of the container 1 may be removed for refilling. Spaced along the length of the support structure are several ties 15 used to hold the tubing to the support structure.

The elongated support structure 3 is an aluminum lightweight frame support having a straight center section and two joined opposite ends with angled brace members 17 and 19. The front end brace 17 has two right angled segments 21 and 23. Segment 23 extends forward to where it rotatably mounts the axis 25 for the movable wheel 27. Above the wheel 27 is a rounded fender member 29 whose lower end is held to the brace segment 23 by a holding clip 31 while the fender's upper free end 33 is spaced from and slightly above the wheel's upper surface.

The tubing 13 connected to the container's outlet nozzle 11 at its rear end, has it forward end opened and mounted to extend through the fender and dispense fluids on the top front of the rotatable wheel 27. In this manner pressurized fluid 35 from the container 1 can be dispensed on the wheel and then the ground G directly in front of and around the path P taken by the rotating wheel. In the figure, the ground G is the grassy side edge of the lawn L adjacent the concrete driveway D. As the fluid 35 is forced from the opened tubular end it strikes the moving tire to provide a path of dispersal the same as or slightly greater than the thickness of the wheel 27. A conventional tubular control valve 37 is mounted on the fender and the tubing section to control the amount of fluid that may be dispensed. In addition the container's nozzle structure, a valve control on handle 9 permits further adjustment of the fluid stream being dispensed.

Also shown in the first figure connected to the rear brace 9 is a vertically disposed rigid element 39 which bears against the front side of the containers and permits two adjustable spaced lateral ring members 41 and 43 to encircle and hold the container 1 to the rigid support 3 structure.

Figure 2:
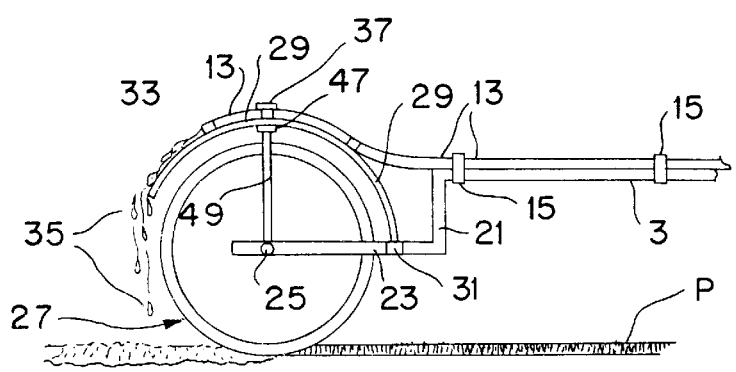
FIG. 2 is an enlarged side view of the FIG. 1 movable front wheel and its associated components.

FIG. 2 is an enlarged side view of of the FIG. 1 movable front wheel 27 and its associated components. The remainder of the connected frame support structure to the right and container 1 in FIG. I have been omitted from this figure. The scrub pad 47 is fixed to the fender 29 just above the wheel 27. This fixed mount to the fender may be accomplished in a variety of ways such as by providing a slit in the pad or by using a holding clip (not shown). On the pad's upper portion there is a concave upward facing surface to seat the tubing 13 section which rest over the fender and passes over the pad before the forward tube's opened end 49 extends through a more forward hole in the fender and terminates just above the wheel. The fixed pad 47 functions to keep the movable tire or wheel 27 clean by brushing away undesired elements on the wheel's outer surface.

Figure 3:
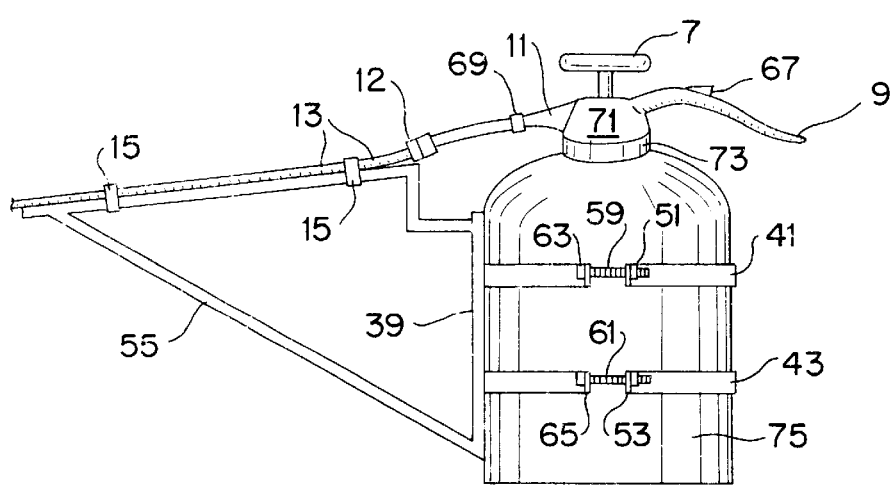
FIG. 3 shows a side view of the pressurized rear fluid container and its associated ring components rotated to show their adjustment ring fasteners not shown in FIG. 1.

FIG. 3 shows a side view of the pressurized fluid container and its associated components ring components rotated 180 degrees to show their adjustments fasteners 51 and 53 not shown in FIG. 1. The remainder of the connected front frame support structure to the left and wheel 27 in FIG. 1 have been omitted from this figure.

A diagonal rigid brace 55 joins the rigid aluminum straight elongated segment 3 to the vertically disposed rigid member 39. Extending from near the top of member 39 and joined thereto is a horizontal portion of segment 3 which the bends into a vertical portion that joins the main straight portion of segment 3. Thus, the main portion of segment 3 is straight, partially shown, and forms part of a rigid enclosing frame support with the diagonal frame member 55, the vertical and horizontal joined portions of member 3. Each of the container encircling rings 41 and 43 extend over the member 39 and have opened ends with two facing plates through which a threaded bolt (59 and 61) passes and is held thereto by an end adjustment nut (63 and 65) as shown. Tightening the adjustment nuts causes the rings to draw tighter around the circumference of the container and, conversely, loosening the nuts loosens either or both of the rings 41 or 43.

The container 1 is a conventional pressurizable fluid dispensing container. The handle 7 is fixed to a vertically movable rod (not shown) which moves up and down to cause air under pressure to impinge upon the fluid in the container. This pressurized fluid is what is dispensed through the tubing 13. The trigger handle 9 has an upper normally closed release biased valve 67 which is pressed to allow the pressurized fluid to exit the container via its nozzle 11. There also is an adjustment nozzle ring 69 to vary the flow pattern of the fluid passing through a hole in the nozzle 1. To supply fluid to the container the container's removable top portion 71 is twisted at the junction 73 where it is threadedly joined to the lower main body of the container 75.

In use a user would hold the trigger handle 9 in one hand while the user's other hand would grasp a convenient portion of the structure 3. After sufficient pressure is achieved by moving handle 7 up and down, the fluid is ready to be dispensed. When it is desire to dispense a fluid to the ground beneath and adjacent to the path followed by the wheel, a user simply applies compressive pressure to depress the trigger's handle 67.

Assuming the forward valve 37 is opened and the nozzle ring 69 is properly adjusted, the pressurized fluid will flow through the tubing 13 and exit from the opened end 49. Pushing forward moves the connected wheel 27 over the ground wheel barrel fashion. Typically the path of disposed liquid will be about the same as the width of the wheel 27 which in one embodiment was 1.5 inches.

Since all of the rigid frame members 3, 17, 39 and 55, including their connecting braces, are made of lightweight aluminum material carrying the rear end with the fluid container 1 is relatively easy to do. When the fluid being dispensed is a weed killer on grass, the formed path provides an atheistically pleasing border around the grass similar to those achieved with an electrical or mechanical edger.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A portable fluid dispenser apparatus comprising:

a rigid frame structure adapted to interconnect a forward wheel with a rear pressurized fluid container;

said frame having a connected fender with a control valve thereon, said fender being located over and adjacent the front wheel;

a forward ground engaging front wheel rotatably connected to said rigid frame structure;

a rear pressurized fluid container mounted on the rear end of said rigid frame structure; and fluid conveying means interconnecting and providing a fluid communication conduit between the fluid container and said ground engaging wheel;

said fluid conveying means comprising a tubular member in fluid communication with the interior fluid contents of the container through a nozzle assembly mounted on the container, said fluid conveying means having an opposite opened end adjacent the upper portion of said front wheel;

said fender control valve being used to control the amount of fluid to be dispensed from the tubular member on the wheel; and said fluid conveying means being fixed to the rigid frame structure along the frame's length with the opened outlet permitted to dispense fluids to the ground in the area immediately under and adjacent to the front of the path to be traveled by the ground engaging wheel.

2. The portable fluid dispenser apparatus as claimed in claim 1, wherein said front wheel has a width with the dispensed fluid path formed being approximately the same width as the width of the front wheel.

3. The portable fluid dispenser apparatus as claimed in claim 2, wherein said rear pressurized fluid container has a hand operated trigger control valve which is normally closed to the dispensing of fluids, said trigger control valve being operative to dispense fluids upon the application of compressive pressure thereto.

* * * * *